(12) United States Patent
Mahgerefteh et al.

(10) Patent No.: US 10,996,394 B2
(45) Date of Patent: May 4, 2021

(54) POLARIZATION INDEPENDENT MULTIPLEXER / DEMULTIPLEXER

(71) Applicant: FINISAR CORPORATION, Sunnyvale, CA (US)

(72) Inventors: Daniel Mahgerefteh, Los Angeles, CA (US); Jared Mikkelsen, Oakville (CA)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/379,660

(22) Filed: Apr. 9, 2019

(65) Prior Publication Data

US 2019/0302364 A1    Oct. 3, 2019

Related U.S. Application Data

(63) Continuation of application No. 15/374,856, filed on Dec. 9, 2016, now Pat. No. 10,254,477.

(Continued)

(51) Int. Cl.
*G02B 6/12*    (2006.01)
*G02B 6/10*    (2006.01)
(Continued)

(52) U.S. Cl.
CPC ......... *G02B 6/12007* (2013.01); *G02B 6/105* (2013.01); *G02B 6/107* (2013.01);
(Continued)

(58) Field of Classification Search
CPC .... G02B 6/12007; G02B 6/105; G02B 6/107; G02B 6/12023; G02B 6/124; G02B 6/126; G02B 6/2931; G02B 2006/12097
See application file for complete search history.

(56) References Cited

U.S. PATENT DOCUMENTS 5,937,113 A  *  8/1999  He ........................... G01J 3/02
                                                       385/11
6,580,862 B2 *  6/2003  Kominato ............. G02B 6/105
                                                       385/129
(Continued)

FOREIGN PATENT DOCUMENTS

CN       1996120 A     7/2007
CN     101320111 A    12/2008
(Continued)

OTHER PUBLICATIONS

Bock et al., Demonstration of a curved sidewall grating demultiplexer on silicon, Optics Express, V. 20, N. 18, 2012 (Year: 2012).*
(Continued)

*Primary Examiner* — Peter Radkowski
(74) *Attorney, Agent, or Firm* — Blank Rome LLP

(57) ABSTRACT

An integrated optical component includes at least one input waveguide, at least one output waveguide; a first slab waveguide having a first refractive index, n1. The first slab waveguide may be disposed between at least one of the input waveguides and at least one of the output waveguides. The integrated optical component may further include a second slab waveguide having a second refractive index, n2. The integrated optical component may also include a third cladding slab having a third refractive index, n3. The third cladding slab may be disposed between the first slab and the second slab. The thickness of the second slab waveguide and the thickness of the third slab waveguide are adjustable to reduce a birefringence of the integrated optical component.

20 Claims, 13 Drawing Sheets

Related U.S. Application Data

(60) Provisional application No. 62/265,262, filed on Dec. 9, 2015.

(51) Int. Cl.
   *G02B 6/124* (2006.01)
   *G02B 6/126* (2006.01)
   *G02B 6/293* (2006.01)

(52) U.S. Cl.
   CPC ............ *G02B 6/124* (2013.01); *G02B 6/126* (2013.01); *G02B 6/12023* (2013.01); *G02B 6/2931* (2013.01); *G02B 2006/12097* (2013.01)

(56) References Cited

U.S. PATENT DOCUMENTS

| | | | |
|---|---|---|---|
| 10,254,477 B2 * | 4/2019 | Mahgerefteh | G02B 6/124 |
| 2002/0122650 A1 * | 9/2002 | Kominato | G02B 6/105 385/131 |
| 2017/0168237 A1 * | 6/2017 | Mahgerefteh | G02B 6/107 |

FOREIGN PATENT DOCUMENTS

| | | |
|---|---|---|
| CN | 102272641 A | 12/2011 |
| CN | 103033945 A | 4/2013 |

OTHER PUBLICATIONS

Bock et al., Subwavelength grating periodic structures in silicon-on-insulator: a new type of microphotonic waveguide, Optics Express, V. 18, N. 19, 2010 (Year: 2010).*

Bock et al., Sub-wavelength grating mode transformers in silicon slab waveguides, Optics Express, V. 17, N. 21, 2009 (Year: 2009).*

Bock et al., Demultiplexer with blazed waveguide sidewall grating and sub-wavelength grating structure, Optics Express, V. 16, N. 22, 2008 (Year: 2008).*

Shyroki et al., Dielectric multilayer waveguides for TE and TM mode matching, J. Opt. A: Pure Appl. Opt. 5 (2003) 192-198 (Year: 2003).*

Office Action in counterpart Chinese Appl. No. 201680081480.6, dated Aug. 19, 2020, 10-pgs.

* cited by examiner

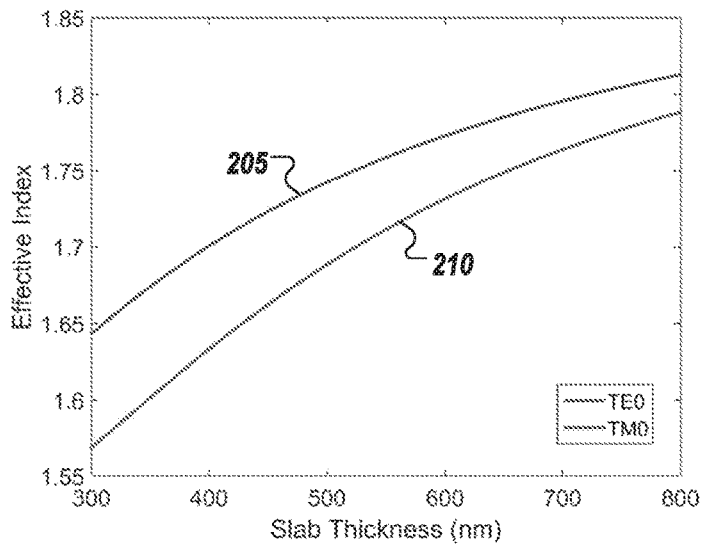
Figure 2A
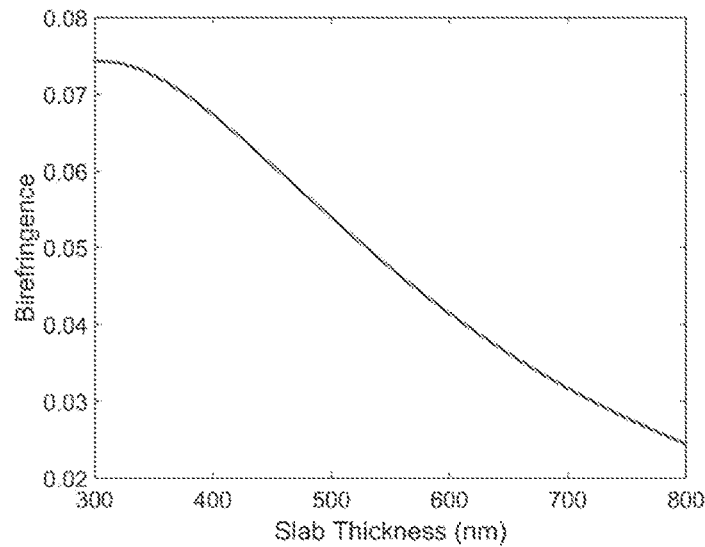
Figure 2B
| Slab Thickness (nm) | $n_{eff,TE0}$ | $n_{eff,TM0}$ | B | Δλ (nm) |
|---|---|---|---|---|
| 500 | 1.742 | 1.689 | 0.0534 | 41.4 |
| 600 | 1.773 | 1.731 | 0.042 | 31.8 |
Figure 2C Fig. 1. Schematic of sub-wavelength grating composed of alternating layers of materials of refractive indices $n_1$ and $n_2$.

POLARIZATION INDEPENDENT MULTIPLEXER / DEMULTIPLEXER

RELATED APPLICATION

This application is a Continuation application of U.S. patent application Ser. No. 15/374,856, filed Dec. 9, 2016, which claims the benefit under 35 U.S.C. § 119(e) of U.S. Provisional Application No. 62/265,262, filed Dec. 9, 2015, both of which are incorporated herein by reference in their entirety.

FIELD

The embodiments discussed herein are related to a polarization-independent photonic integrated circuit (PIC).

BACKGROUND

Unless otherwise indicated herein, the materials described herein are not prior art to the claims in the present application and are not admitted to be prior art by inclusion in this section.

Waveguide-based optical devices in silicon (Si) photonics may be highly birefringent due to a high confinement of light in the waveguide. An example of a waveguide-based optical device that may be highly birefringent may include a wavelength division de-multiplexer (WDM demux) which may be used at a receiver of an integrated Si photonic integrated circuit (PIC). A transfer function of the WDM demux may be different for transverse-electrical (TE) and transverse-magnetic (TM) polarizations, which may lead to a relatively large (e.g., 30-40 nm) wavelength shift between the two transfer functions for the TE and TM polarizations. This difference in wavelength associated with the TE and TM polarizations may result in channel cross-talk when an optical signal with an unknown or mixed polarization is demultiplexed by a WDM demux with a polarization-dependent filter function.

The subject matter claimed herein is not limited to implementations that solve any disadvantages or that operate only in environments such as those described above. Rather, this background is only provided to illustrate one example technology area where some implementations described herein may be practiced.

BRIEF DESCRIPTION OF THE DRAWINGS

Example embodiments will be described and explained with additional specificity and detail through the use of the accompanying drawings in which:

FIG. 2A illustrates a graphical representation of an example relationship between a slab thickness and effective index;

FIG. 2B illustrates a graphical representation of an example relationship between a slab thickness and birefringence;

FIG. 2C illustrates a table of example relationships between slab thicknesses, effective indices, birefringence, and wavelength shifts;

DETAILED DESCRIPTION OF SOME EXAMPLE EMBODIMENTS

Figure 1:
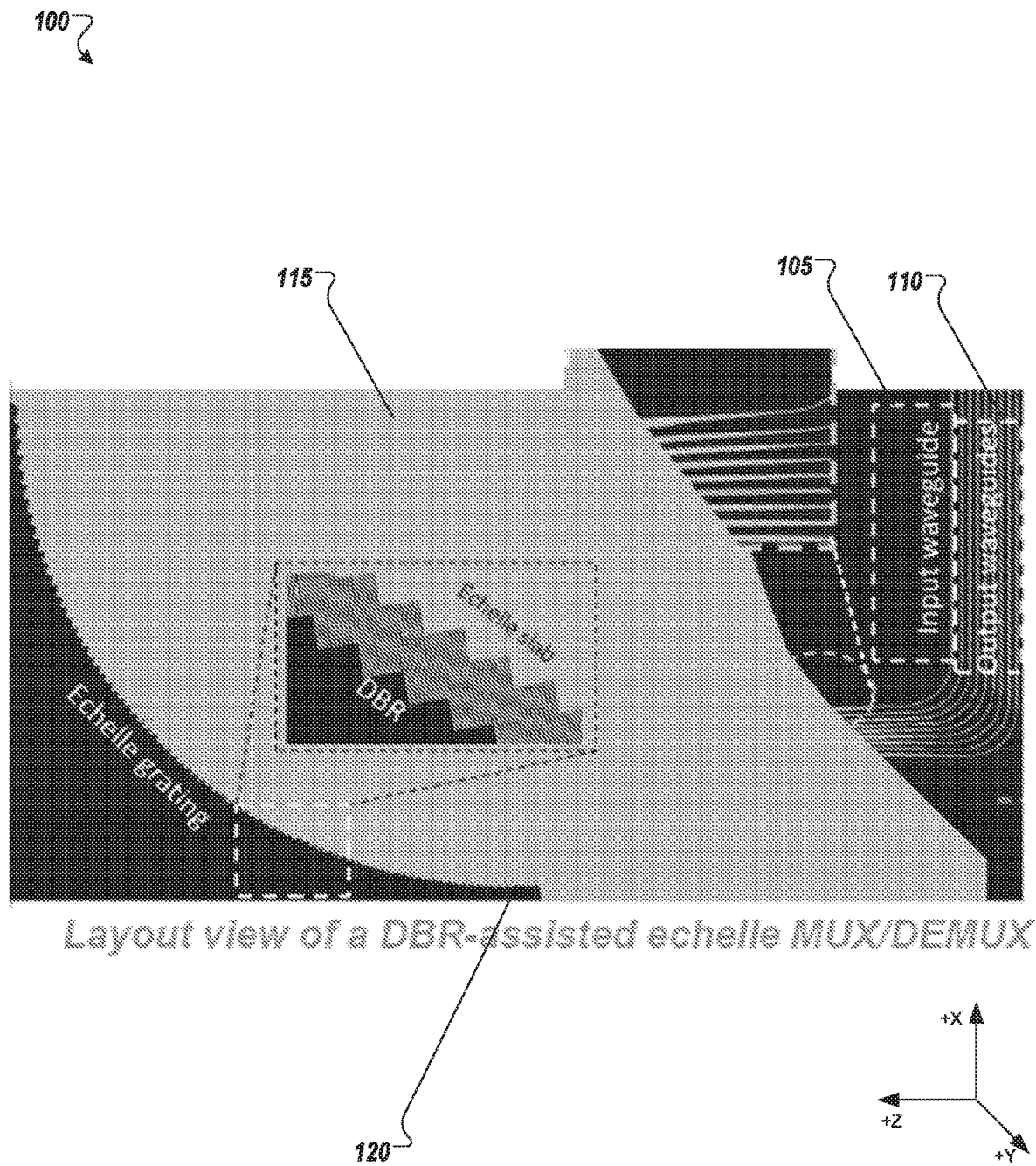
FIG. 1 illustrates a top layout view of a distributed Bragg reflector mirrors (DBR)-assisted Echelle grating WDM mux/demux.

The performance of some optical components, including optical amplifiers and optical waveguide coupled components used in an optical communication system, may depend upon the polarization state of an incident optical signal received by the component. The optical device may be polarization-dependent, meaning that the optical device may have a different influence on different polarization modes of an incident signal. Incident signals with different polarization states, for example, may be affected by an optical device in different ways. For example, TE and TM effective indices and optical transfer functions for TE and TM may differ for the optical device.

Since the polarization or other characteristics of the light input to the optical device may not always be known, some conventional techniques may include using a polarization splitter to separate TE and TM and then passing each polarization through a separate de-multiplexer. This technique, however, may add loss and the additional de-mux may take up more area on an integrated device.

Wavelength division multiplexers ("WDM muxes"), WDM demuxes and other such waveguide-based components integrated in PICs, for example, may have high birefringence. Birefringence is an optical property of a material having a refractive index that may depend on the polarization and propagation direction of light. Birefringence may be quantified as a difference between refractive indices exhibited by a material. In WDM demux devices, for example, TE and TM effective indices may be different and that difference may contribute to birefringence. Birefringence may be a problem for Si and silicon nitride ($Si_xN_y$, generically referred to herein as SiN) based WDM muxes and WDM demuxes.

Aspects of the present disclosure may address these and other shortcomings of conventional systems by providing a waveguide-based optical device that may have less birefringence as compared to conventional devices. Systems and methods described herein may be applied to any type of waveguide-based optical device, such as an Echelle grating WDM demux, a delay line interferometer based WDM demux, an optical differential phase-shift keying demodulator, an arrayed waveguide grating WDM demux, among others. For ease of reference in the discussion that follows, the systems and techniques are often discussed in the context of a WDM demux with the understanding that the disclosure may apply to any type of WDM mux or WDM demux.

In at least one embodiment, an integrated optical component may include at least one input waveguide, at least one output waveguide, and a first slab waveguide having a first refractive index, n1. The first slab waveguide may be disposed between at least one of the input waveguides and at least one of the output waveguides. The integrated optical component may also include a second slab waveguide having a second refractive index, n2. The integrated optical component may further include a third cladding slab having a third refractive index, n3. The third cladding slab may be disposed between the first slab and the second slab. The thickness of the second slab waveguide and the thickness of the third slab waveguide may be adjustable to reduce a birefringence of the integrated optical component.

FIG. 1 illustrates a top layout view of a distributed Bragg reflector mirrors (DBR)-assisted Echelle grating WDM mux/demux 100 (hereafter "de-multiplexer" 100). The de-multiplexer 100 may include WDM demux components, such as an input waveguide 105, one or more output waveguides 110, a free-space slab propagation region 115, and a signal splitter 120, which is illustrated with distributed Bragg reflector mirrors (e.g., grating). Any or all of the WDM demux components 105, 110, 150 and/or 120 may be fabricated on a Si photonic integrated circuit (PIC). The Si PIC may include modulators, waveguides, detectors, couplers, and other optical components in a Si on Insulator (e.g., silicon on silicon dioxide ($SiO_2$) box layer) on Si substrate.

The input waveguide 110 may receive an input signal (e.g., light). The input signal may travel through the input waveguide 110 and through the free-space slab propagation region 115 toward the signal splitter 120. The signal splitter 120 may divide the input signal into multiple beams. The signal splitter 120 may also send (e.g., reflect) the beams to the one or more output waveguides 110. Each of the beams may generally include a different one of multiple wavelength channels included in the input signal.

In some embodiments, WDM demux components included in the de-multiplexer 100 may be polarization sensitive. For example, WDM demux components such as SiN based DBR-assisted Echelle gratings or other signal splitters 120 may exhibit a polarization-dependent filter function. In particular, the filter function of such WDM demux components may shift one polarization of light more than another polarization of light which can lead to crosstalk for channels at a receiver. For example, an SiN based Echelle grating in a 500 nm SiN layer may shift TE polarization of a 1310 nm wavelength channel by 38 nm to an output guide that also receives TM polarization of a different wavelength channel, resulting in cross-talk between the two channels. In this example, effective indices for TE versus TM may differ by approximately 0.052. In some embodiments, the wavelength shift of the de-multiplexer 100 may be caused, at least in part, by a birefringence of the free-space slab propagation region 115.

Accordingly, the free-space slab propagation region 115 may be configured to reduce birefringence. In some embodiments, a thickness of the free-space slab propagation region 115, e.g., in a Y direction of an arbitrarily defined set of XYZ coordinate axes, may be increased to reduce birefringence. The thickness of the free-space slab propagation region 115 may refer to a SiN layer thickness in the free-space slab propagation region 115 as is sometimes referred to herein and in the drawings as "slab thickness."

As illustrated in FIG. 2A, as the thickness of the free-space slab propagation region 115 increases, the effective indices of TE and TM become closer to each other, thereby reducing birefringence. Curve 205 represents effective index of a TE0 mode in the free-space slab propagation region 115 and curve 210 represents effective index of a TM0 mode in the free-space slab propagation region 115, both as a function of slab thickness. FIG. 2B illustrates the birefringence of the free-space slab propagation region 115 as the thickness of the free-space slab propagation region 115 increases. The birefringence may be defined as a difference between the effective indices of TE and TM, which may be represented by the following equation:

$$B = \Delta\eta = \eta_{\textit{eff},TE0} - \eta_{\textit{eff},TM0}.$$

As illustrated in FIG. 2B, birefringence B decreases as thickness of the free-space slab propagation region 115 increases.

FIG. 2C additionally includes a table with various TE and TM effective index values ($\eta_{\textit{eff},TE0}$, $\eta_{\textit{eff},TM0}$) of the free-space slab propagation region 115 for slab thicknesses of 500 nm and 600 nm. For each slab thickness, a corresponding birefringence (B) and a wavelength shift ($\Delta\lambda$) is also provided.

Figure 3A:
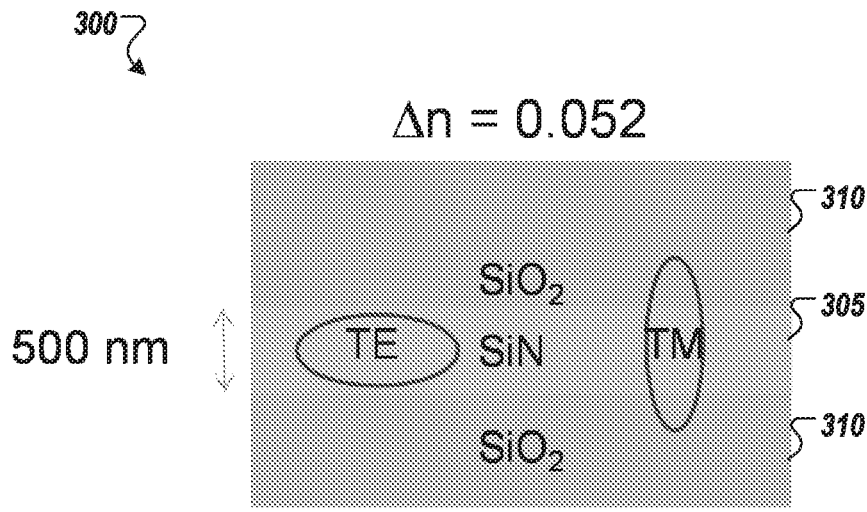
FIG. 3A illustrates a layer view of a free-space slab propagation region with a 500 nm SiN layer bounded by two SiO$_2$ layers.

FIG. 3A illustrates a layer view 300 of a free-space slab propagation region with a 500 nm SiN layer 305 bounded by two $SiO_2$ layers 310. The layer view 300 may be a side view of the de-multiplexer 100 of FIG. 1. As discussed above, the birefringence (B=$\Delta\eta$) of the 500 nm SiN layer 305 represented in FIG. 3A is approximately 0.052. As discussed in conjunction with FIG. 2C, the TE effective index is higher than TM effective index. Turning back to FIG. 3A, the TM mode may be less confined in the Y direction than the TE mode, as indicated by ovals surrounding the TE and TM.

Figure 3B:
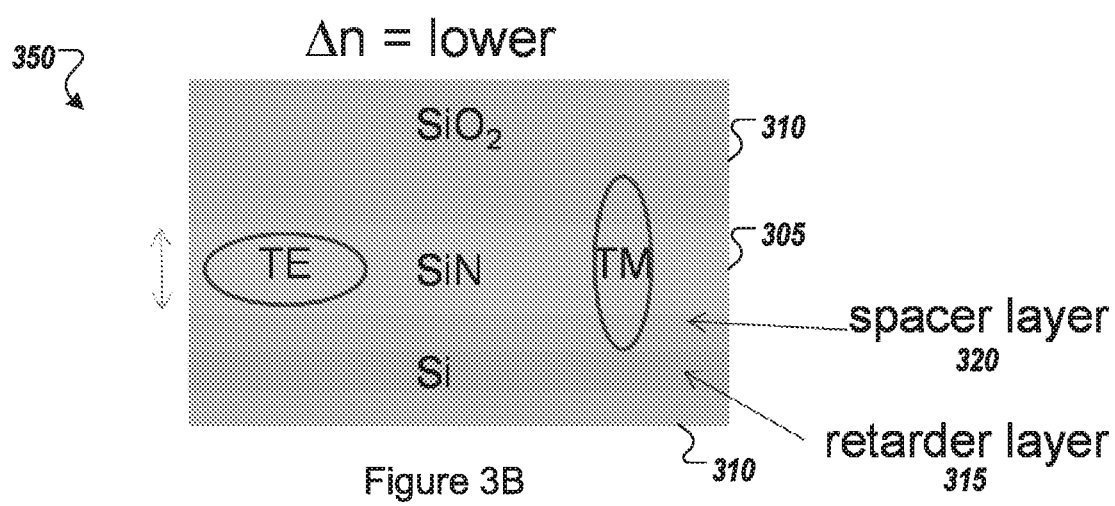
FIG. 3B illustrates a layer view of a free-space slab propagation region with SiN layer, a retarder layer and a spacer layer.

FIG. 3B illustrates a layer view 350 of a free-space slab propagation region with SiN layer 305 (e.g., a first slab waveguide), a retarder layer 315 (e.g., a second slab waveguide) and a spacer layer 320 (e.g., a third cladding slab). In general, the retarder layer 315 may be spaced a predetermined distance away from the SiN layer 305. A spacer layer 320 may be formed between the retarder layer 315 and the SiN layer 305. The thicknesses of the retarder layer 315 and the spacer layer 320 may be configured to reduce birefringence of the free-space slab propagation region illustrated in FIG. 3B. The retarder layer 315 may include a Si layer and the spacer layer 320 may include a SiO₂ layer. As illustrated, the TM mode may overlap or otherwise interact with the retarder layer 315 more than the TE mode. To increase the TM effective index to more closely match the TE effective index, the thickness of the spacer layer 320 and/or Si retarder layer 315 may be adjusted. In this manner, birefringence of the free-space slab propagation region of FIG. 3B may be reduced by adjusting the thickness of the spacer layer 320 and/or the Si retarder layer 315. In some embodiments, the adjustments of the spacer layer and or retarder layers may be limited by an existing process which defines the thickness of the Si and SiO₂ layers. The possible thicknesses of the retarder and spacer layers in some processes may not be optimal for the reduction of birefringence. Also, changing those processes, which would allow fabrication of the optimal thicknesses, may not be desirable since it may add cost and may affect other devices in a Silicon Photonic circuit. In some embodiments, a structured Si layer having sub-wavelength gratings in the free-space slab region may be implemented to emulate a particular effective index for the retarder layer, as illustrated in FIG. 3B. This may allow one to use an existing thickness of a Si layer to produce a desired effective index which may be lower than that of Silicon. For a given spacer distance, one may configure the structure of the sub-wavelength grating may be configured to reduce the birefringence. In some embodiments, the thicknesses of the Si retarder layer 315 and the spacer layer 320 are configured such that the resulting birefringence is below a threshold birefringence value. In at least one embodiment, the threshold birefringence value is 0.1. In at least one embodiment, the threshold birefringence value is below 0.3.

Figure 4A:
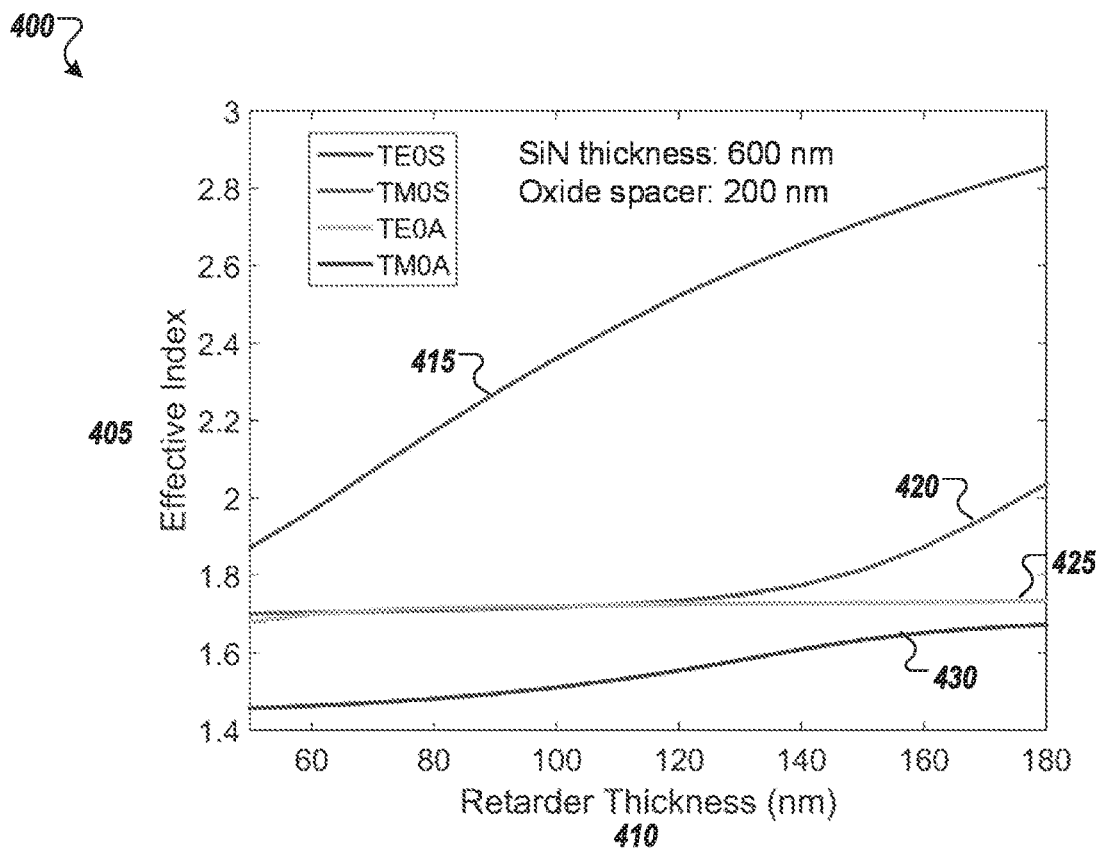
FIG. 4A illustrates a graphical representation of a simulation of effective index as a function of retarder thickness between 50 and 180 nm thick, a SiN thickness of 600 nm and a spacer thickness of 200 nm for four different polarization modes.

FIG. 4A illustrates a graphical representation 400 of a simulation of effective index 405 as a function of retarder thickness 410 between 50 and 180 nm thick, a SiN thickness of 600 nm and a spacer thickness of 200 nm for four different polarization modes (TE0S, TM0S, TE0A, TM0A), arranged in accordance with at least one embodiment described herein. Curves 415, 420, 425, and 430 respectively represent effective index of the TE0S mode, the TM0S mode, the TE0A mode, and the TM0A mode. It can be seen that of the four different polarization modes, the TE0S mode (curve 415) has the highest effective index and the TM0A mode (curve 430) has the lowest effective index.

Figure 4B:
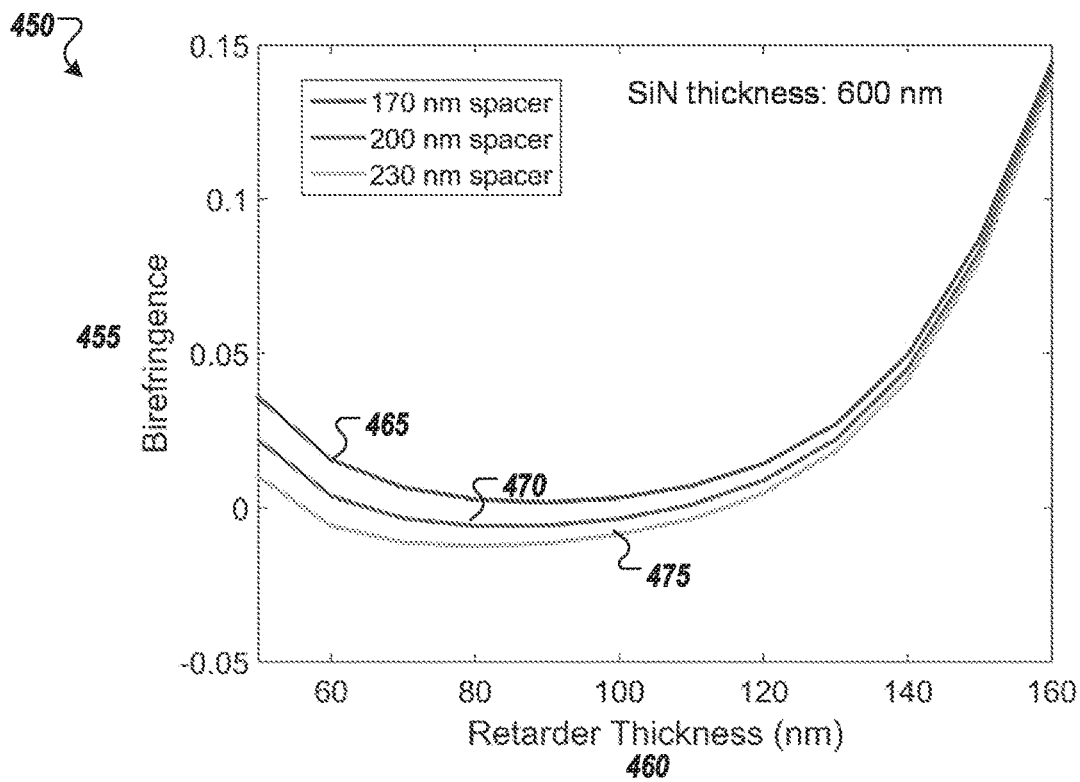
FIG. 4B illustrates a graphical representation of a simulation of birefringence of a waveguide-based optical device as a function of retarder thickness between 50 and 160 nm thick, a SiN thickness of 600 nm and three different spacer thicknesses of 170 nm, 200 nm and 230 nm.

FIG. 4B illustrates a graphical representation 450 of a simulation of birefringence 455 of a waveguide-based optical device as a function of retarder thickness 460 between 50 and 160 nm thick, a SiN thickness of 600 nm and three different spacer thicknesses of 170 nm, 200 nm and 230 nm, in accordance with at least one embodiment described herein. Curves 465, 470, and 475 respectively represent birefringence for slab thicknesses of 170 nm, 200 nm, or 230 nm. It can be seen that for a SiN thickness of 600 nm and a 170 nm thick spacer (curve 465), the birefringence of the waveguide-based optical device is nearest to zero when the retarder thickness 460 is around 90 nm. It can also be seen that for a SiN thickness of 600 nm and a 200 nm thick spacer (curve 470), the birefringence of the waveguide-based optical device is approximately zero when the retarder thickness is around 60 nm thick and also around 110 nm thick. It can be seen that for a SiN thickness of 600 nm and a 230 nm thick spacer (curve 475), the birefringence of the waveguide-based optical device is approximately zero when the retarder thickness is around 60 nm thick and also around 120 nm thick.

Figure 5:
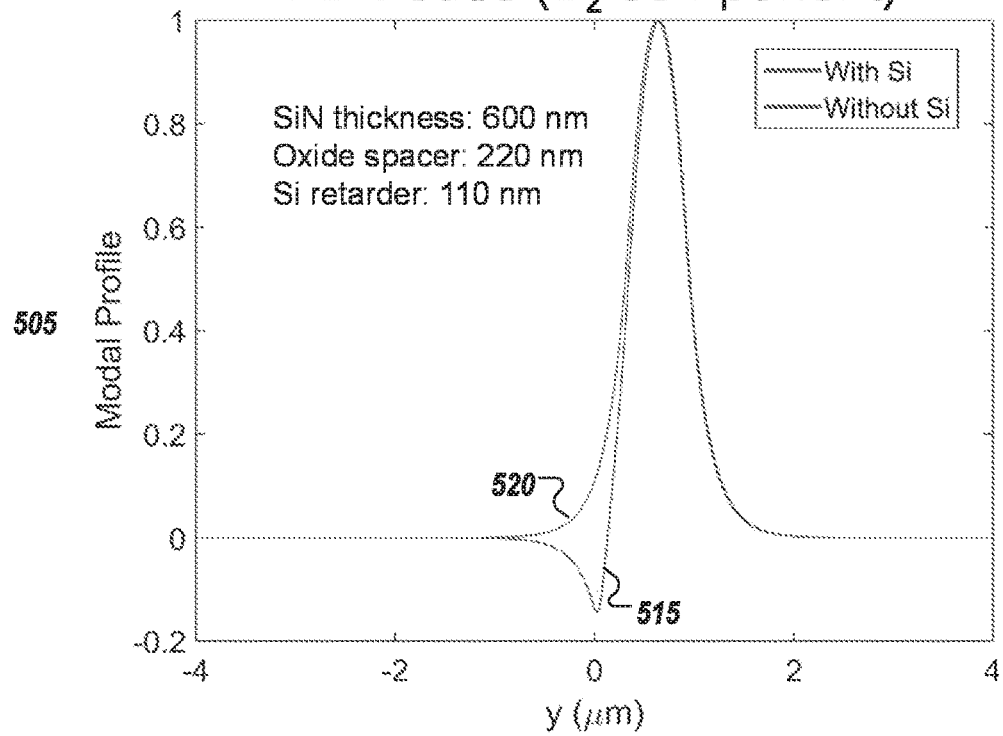
FIG. 5 illustrates a graphical representation of a simulation of TE and TM polarization modal profiles overlap integrals of an isolated SiN slab waveguide.
Figure 5:
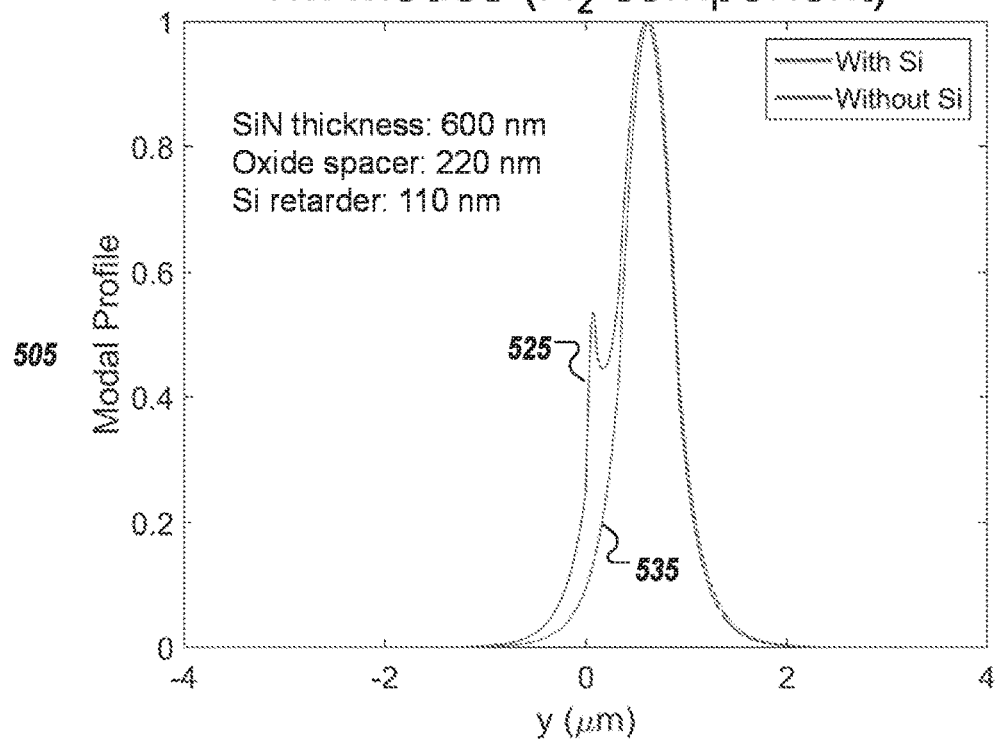

FIG. 5 illustrates a graphical representation 500 of a simulation of TE and TM polarization modal profiles 505 overlap integrals of an isolated SiN slab waveguide, arranged in accordance with at least one embodiment described herein. Curves 515 and 520 respectively represent modal profiles for TE modes with Si and without Si, both as a function of position y in µm, which represents the direction perpendicular to the surface of the Si photonic circuit (see FIG. 3 for definition of y axis). Curves 525 and 530 respectively represent modal profiles for TM modes with Si and without Si, both as a function of y in µm. To efficiently excite TE and TM polarization modes when the retarder is introduced into the slab, the overlap integrals with an isolated slab waveguide (without the Si layer) may be nearly 1, as illustrated.

Figure 6:
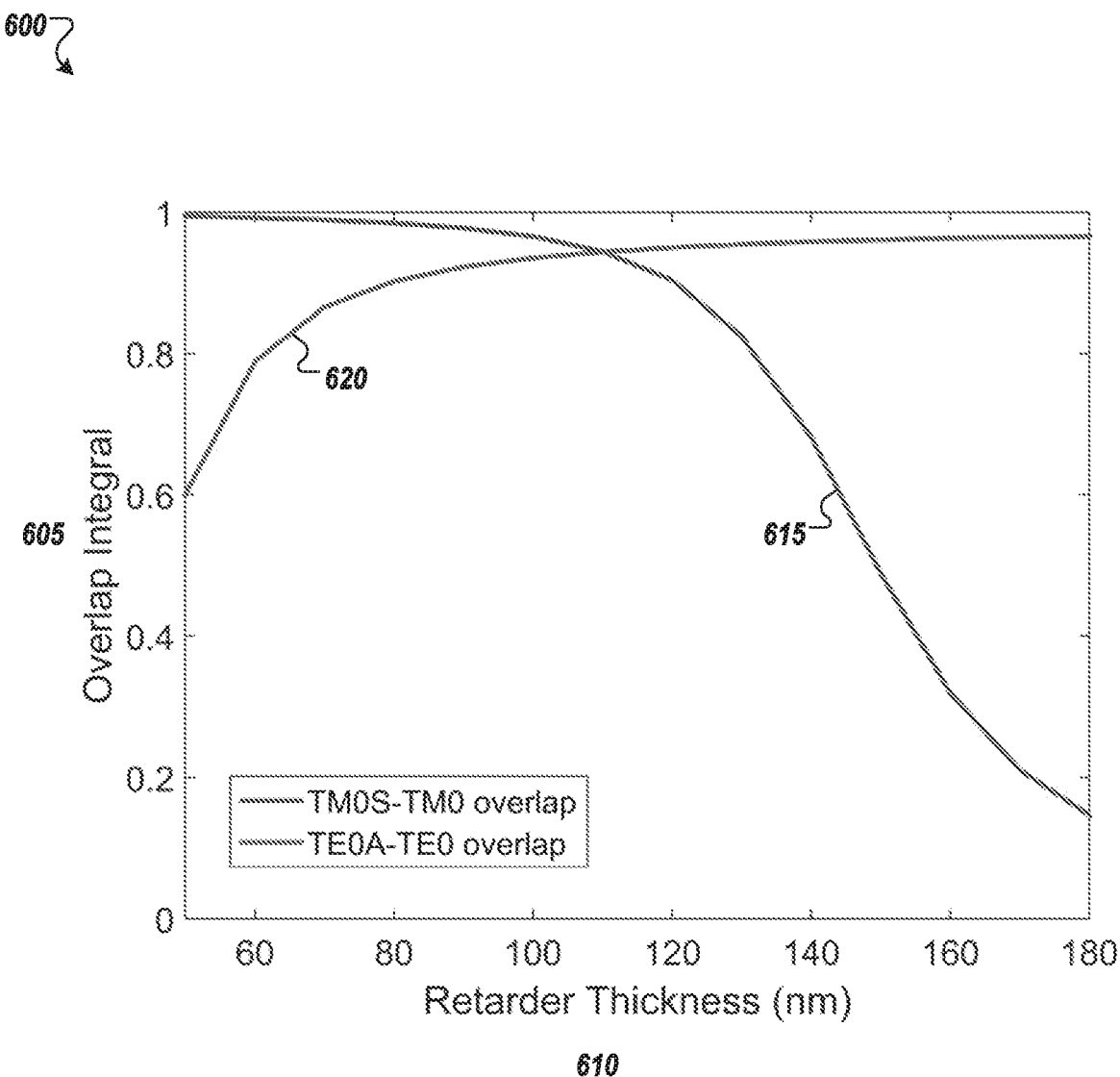
FIG. 6 illustrates a graphical representation of a simulation of TE and TM polarization modal profiles overlap integrals as a function of retarder thickness.

FIG. 6 illustrates a graphical representation 600 of a simulation of TE and TM polarization modal profiles overlap integrals 605 as a function of retarder thickness 610, arranged in accordance with at least one embodiment described herein. As illustrated, TM0S-TM0 overlap (curve 615) may decrease with increasing retarder thickness as TM0S mode migrates from the SiN layer to the Si layer. Also illustrated, the TE0A-TE0 overlap (curve 620) increases as TE0A mode migrates further away from the Si layer. For each SiN thickness and spacer thickness, there may be retarder thickness for which the TE and TM overlaps are equal. The intersection point between the two curves 615, 620 indicates a point where the polarization dependent loss (PDL) due to the overlap of the modes from SiN to the region with retarder is zero. An overlap loss of <0.2 dB may be achievable for TE and TM polarizations.

Figure 7:
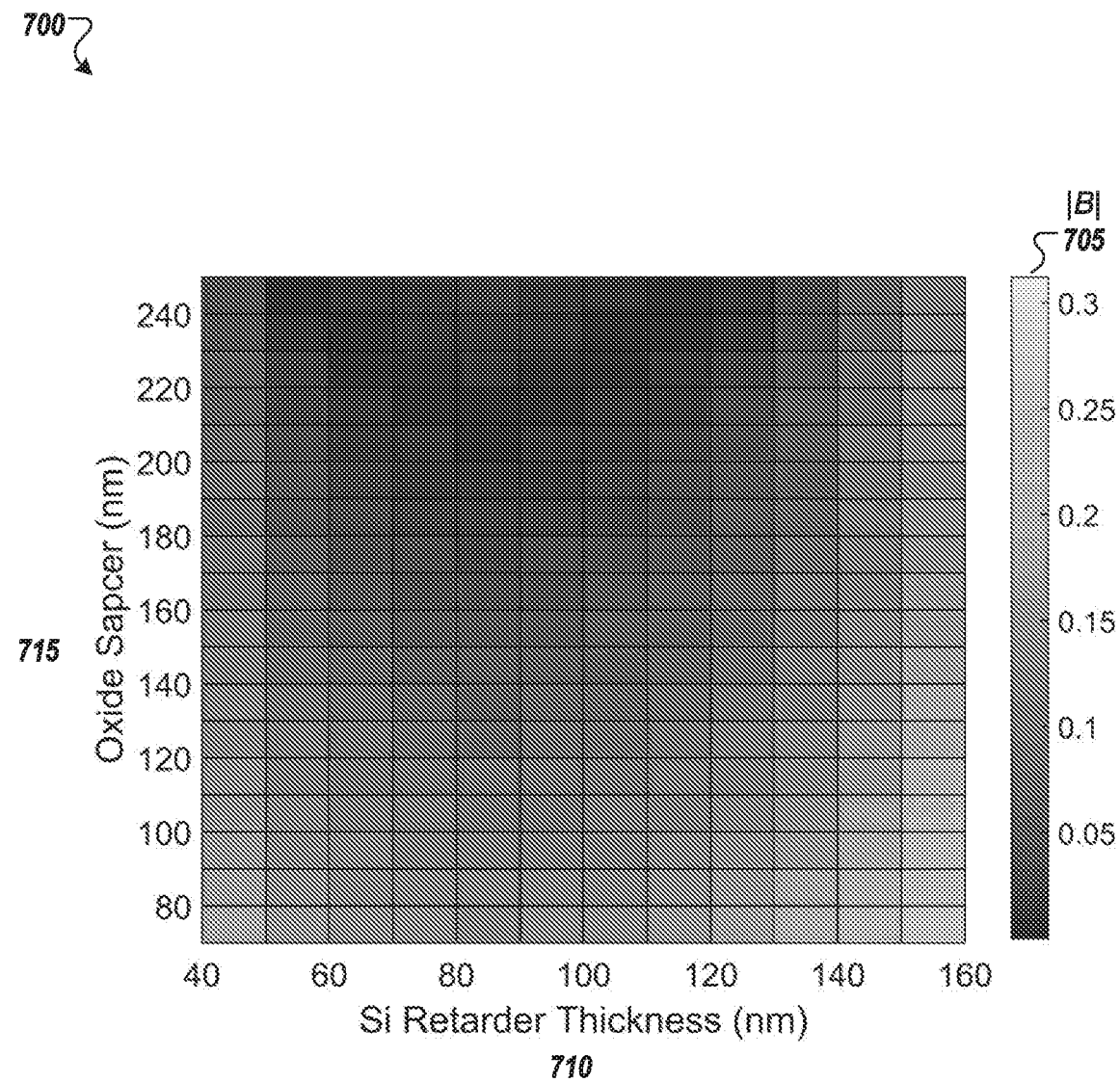
FIG. 7 is a graphical representation of absolute birefringence |B| as a function of retarder thickness and spacer thickness.

FIG. 7 is a graphical representation 700 of absolute birefringence |B| 705 as a function of retarder thickness 710 and spacer thickness 715, arranged in accordance with at least one embodiment described herein. It can be seen that absolute birefringence |B| 705 is minimized for retarder thicknesses 710 generally between 60-120 nm and spacer thicknesses 715 generally between 180-240 nm.

Figure 8:
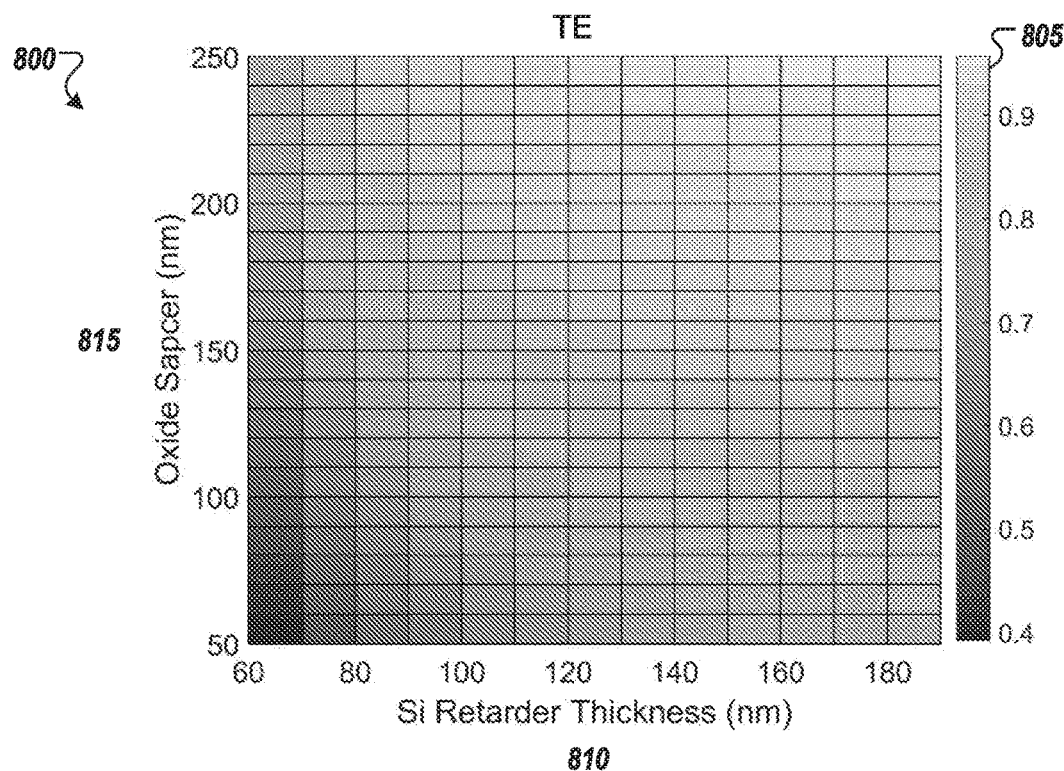
FIG. 8 is a graphical representation of TE and TM overlap as a function of retarder thickness and spacer thickness.
Figure 8:
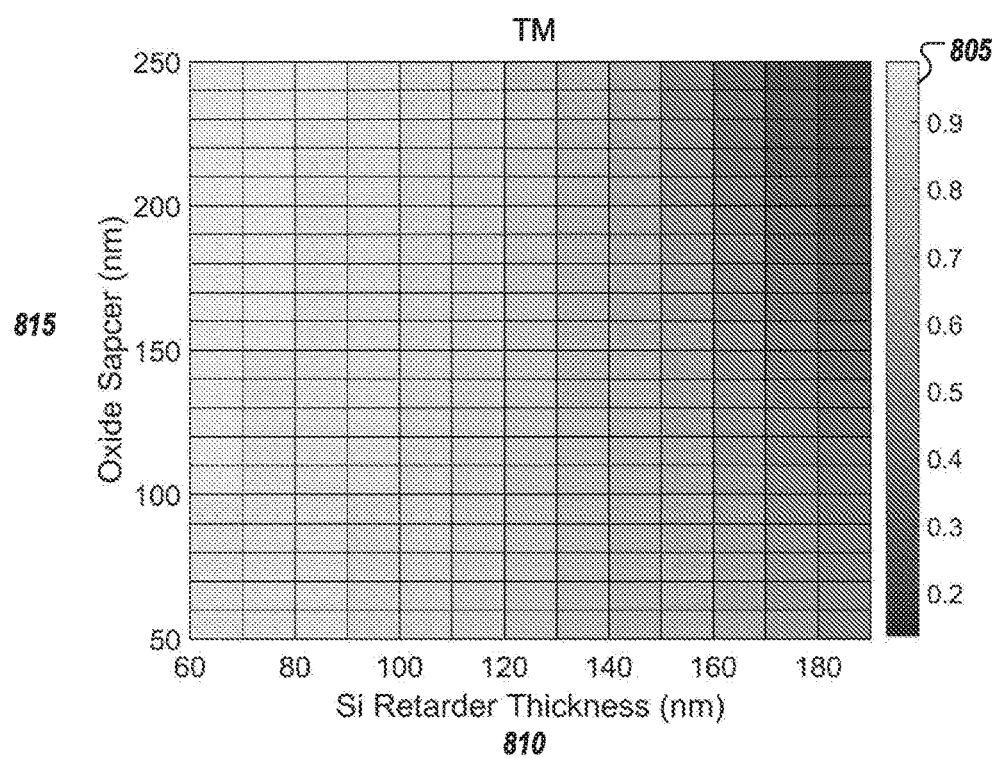

FIG. 8 is a graphical representation 800 of TE and TM overlap 805 as a function of retarder thickness 810 and spacer thickness 815, arranged in accordance with at least one embodiment described herein. TE and TM overlap is highest at or near 1. It can be seen that TE overlap is at or near 1 when the spacer thickness is generally between 200-250 nm and the retarder thickness is between 130-190 nm. It can be seen that TM overlap is at or near 1 when the spacer thickness is between 50-250 nm and the retarder thickness is between 60-100 nm.

Figure 9:
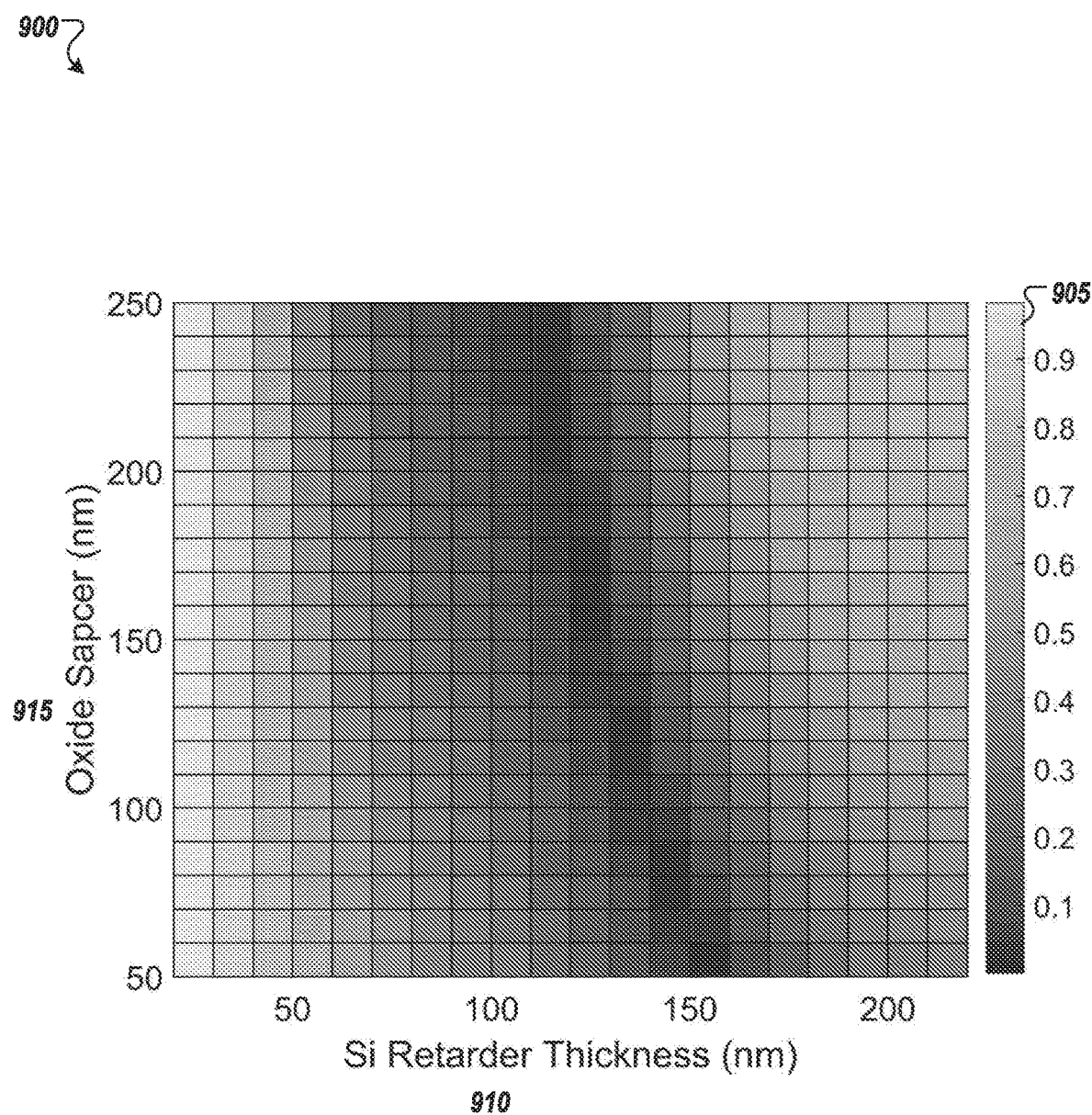
FIG. 9 is a graphical representation of absolute PDL as a function of retarder thickness and spacer thickness.

FIG. 9 is a graphical representation 900 of absolute PDL 905 as a function of retarder thickness 910 and spacer thickness 915, arranged in accordance with at least one embodiment described herein. For each retarder thickness, there may be a retarder thickness for which the TE and TM overlaps are equal (e.g., PDL=0). It can be seen that PDL is nearly equal to 0 when retarder thickness is generally between 130-160 nm and the spacer thickness is generally between 50-90 nm. It can also be seen that PDL is nearly equal to 0 when retarder thickness is generally between 120-150 nm and the spacer thickness is generally between 90-160 nm. It can further be seen that PDL is nearly equal to 0 when retarder thickness is generally between 100-120 nm and the spacer thickness is generally between 160-250 nm.

Figure 10A:
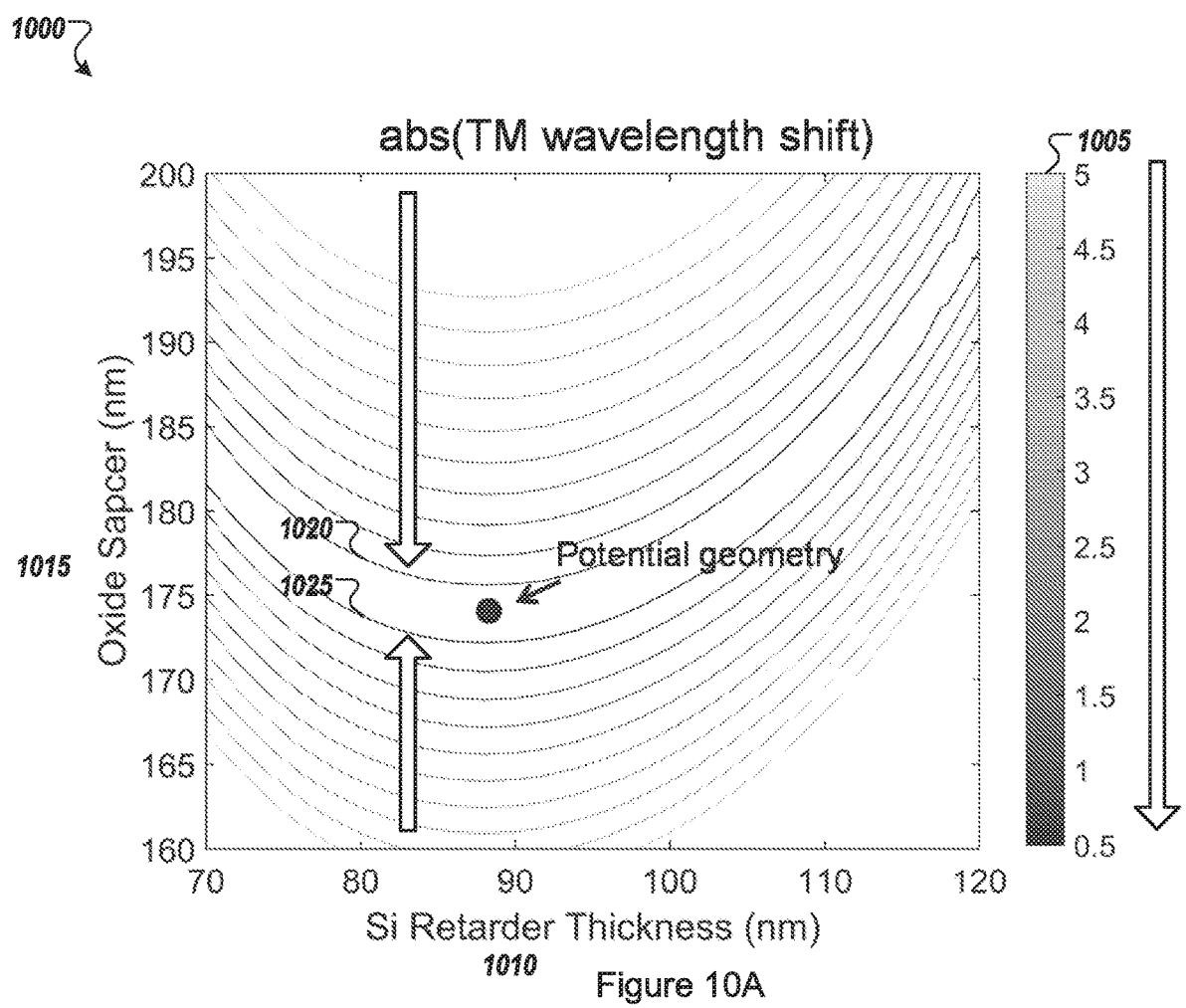
FIG. 10A is a graphical representation of potential parameters for retarder and spacer geometry.

FIG. 10A is a graphical representation 1000 of potential parameters for retarder 1010 and spacer 1015 geometry, in accordance with at least one embodiment described herein. Potential geometry for the retarder and spacer may be better where the birefringence is close to 0. As illustrated, the arrows indicate a direction of decreasing birefringence.

Birefringence may be related to wavelength shifts. For example, as the wavelength shift of TM with respect to TE is close to 0, the birefringence may also be low. It can also be seen that a boundary created between the curves 1020 and 1025 represents a low (e.g., below 1) wavelength shift 1005. As illustrated, the potential geometry may use any spacer thickness and retarder thickness defined by the "U" shaped band bounded by the dark blue lines that starts between 180-185 nm spacer thickness and 70 nm retarder thickness, where the spacer thickness decreases as retarder thickness increases until the retarder thickness is around 90 nm and the spacer thickness is between 177-174 nm, and then from that point, the spacer thickness increases as retarder thickness increases until the retarder thickness is around 120 nm and the spacer thickness is between 194-199 nm.

Figure 10B:
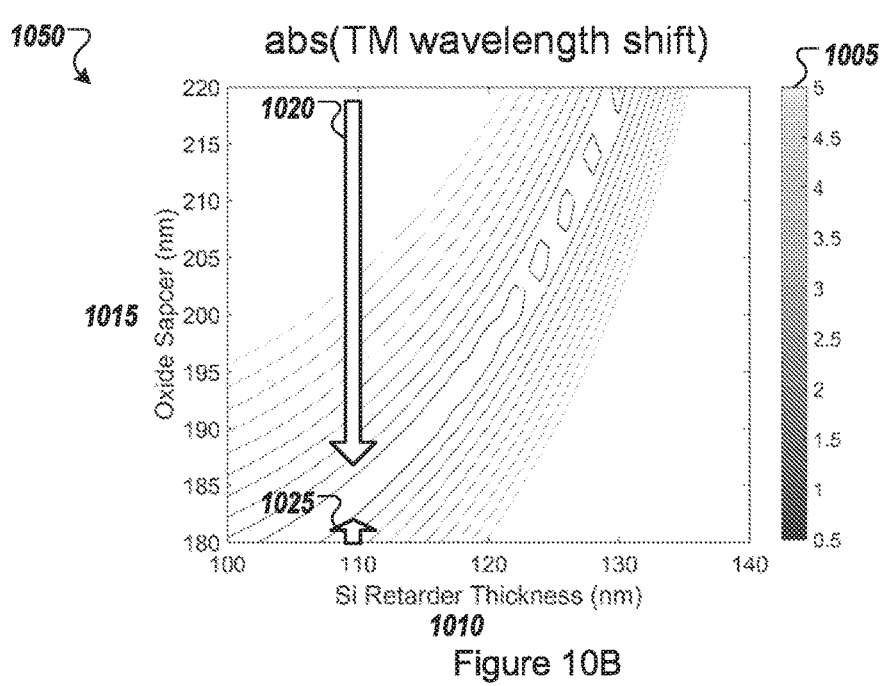
FIG. 10B is another graphical representation of potential parameters for retarder and spacer geometry.

FIG. 10B is another graphical representation 1050 of potential parameters for retarder 1010 and spacer 1015 geometry, in accordance with at least one embodiment described herein. It can be seen that FIG. 10B illustrates retarder 1010 and spacer 1015 geometry at some higher thicknesses than shown in FIG. 10A.

Figure 11A:
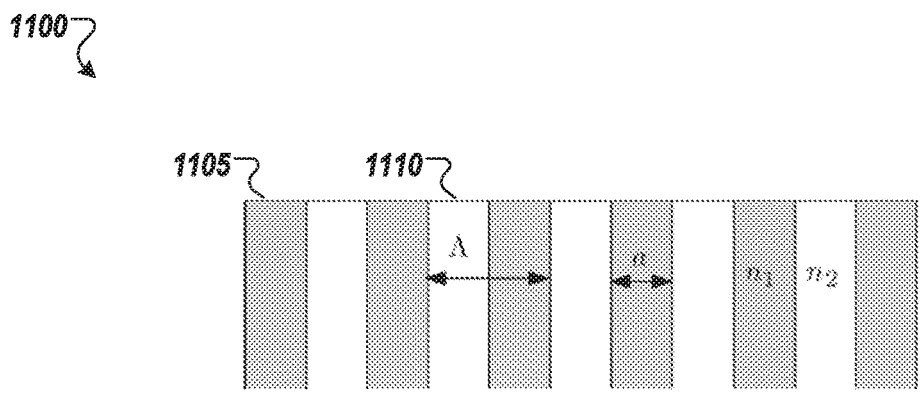
FIG. 11A is a sub-wavelength grating structure configured to reduce birefringence in a waveguide-based optical device.

FIG. 11A is a sub-wavelength grating structure 1100 configured to reduce birefringence in a waveguide-based optical device, arranged in accordance with at least one embodiment described herein. For periodic media with subwavelength periodicity, diffractive effects may be suppressed and the resulting periodic media may behave similar to an effectively homogenous medium. The periodic media may have alternating layers of different dielectric materials. It can be seen that a first material 1105 is in gray and a second material 1110 is in white. Each of the materials may be periodically repeated with subwavelength periodicity with respect to a wave that is to interact with the periodic media. The different materials may have different effective refractive indices, $\eta_1$ and $\eta_2$ respectively. In an example, by varying the duty cycle $f_1 = a/\Lambda$, where a is the thickness of each layer and $\Lambda$ is the distance between two of the same layers, any effective refractive index may be obtained in the resulting periodic media. In some embodiments, the effective refractive index may be between 1.45 (silica) and 3.5 (silicon).

Figure 11B:
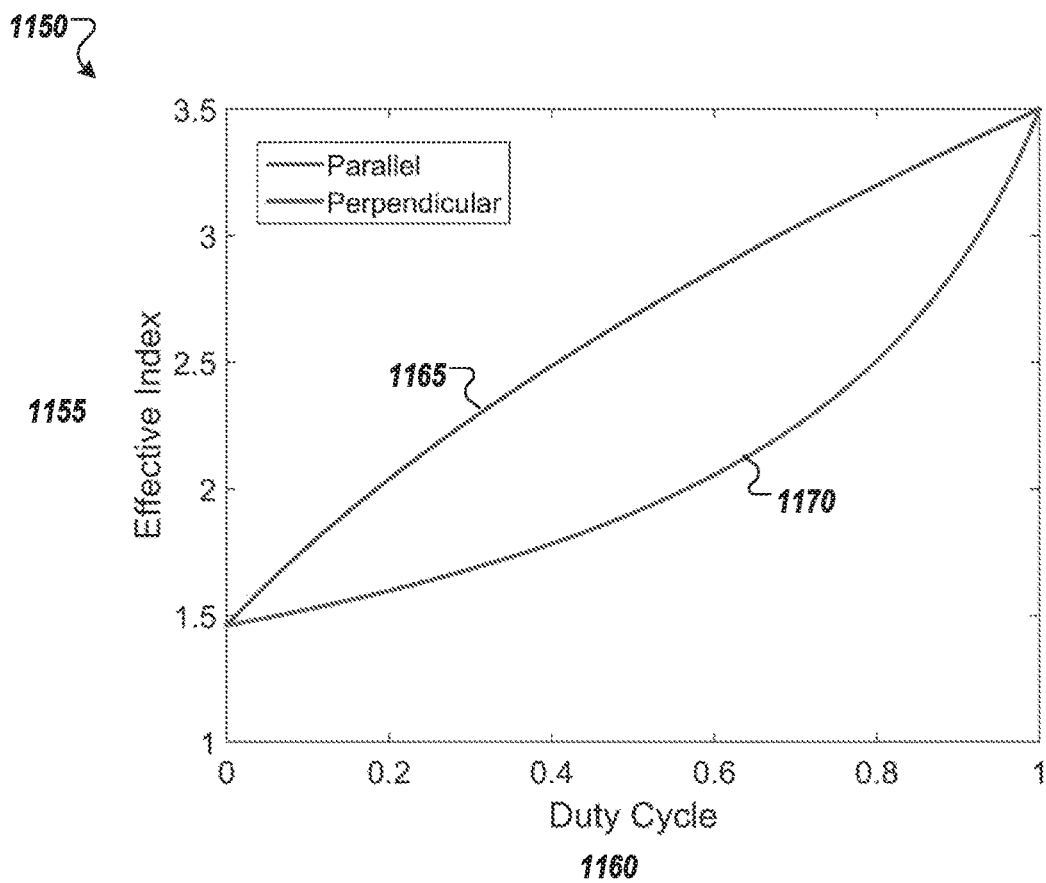
FIG. 11B is a graphical representation of an effective refractive index as a function of duty cycle.

FIG. 11B is a graphical representation 1150 of an effective refractive index 1155 as a function of duty cycle 1160. Curve 1165 represents a parallel effective refractive index and may be derived based on the equation: $n_{\parallel}^2 = f_1 n_1^2 + (1-f_1) n_2^2$. Curve 1170 represents a perpendicular effective refractive index and may be derived based on the equation:

$$\frac{1}{n_{\perp}^2} = f_1 \frac{1}{n_1^2} + (1-f_1) \frac{1}{n_2^2}.$$

Figure 12A:
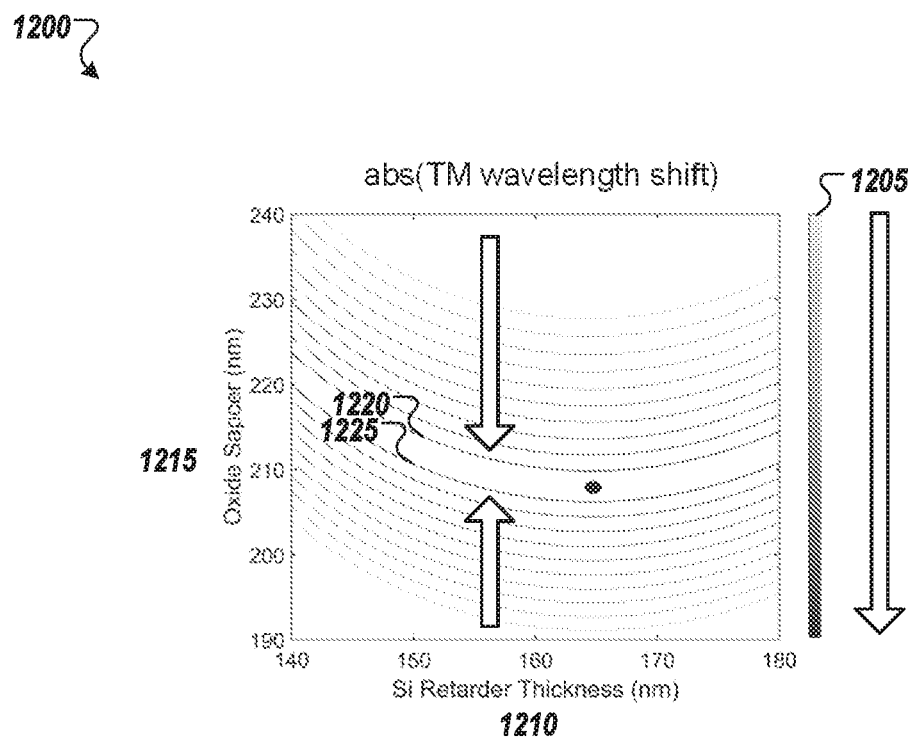
FIG. 12A is a graphical representation of a simulation of an effective retarder index.

FIG. 12A is a graphical representation 1200 of a simulation of an effective retarder index 1205, arranged in accordance with at least one embodiment described herein. Illustrated are slab structure modal profiles and effective indices for different values of $n_{retarder}$, which may be adjusted by changing the structure of the silicon. For $n_{retarder}=2.57$, a corresponding retarder layer thickness 1210 is approximately 165 nm. As discussed above in conjunction with FIG. 10, potential geometry for the retarder was 90 nm thick, which may be manufactured using some manufacturing processes and tooling. Turning back to FIG. 12A, the thickness of 165 nm for the retarder may be compatible with other manufacturing processes and tooling. Similarly, a corresponding spacer thickness 1215 of 210 nm may be compatible with some manufacturing processes and tooling. Using sub-wavelength grating structures to reduce the effective index of retarder, a resulting PIC with retarder and layer thicknesses of 165 nm and 210 nm, respectively, may have similar birefringence reduction capabilities to a PIC that does not use sub-wavelength grating structures and has retarder and layer thicknesses of 90 nm and 175 nm, respectively. As illustrated, the arrows indicate a direction of decreasing birefringence. It can be seen that a boundary between the curves 1220 and 1225 represents a low abs (TM wavelength shift). The sub-wavelength grating structures (see FIG. 11A) may be provided in, e.g., the Si retarder layer.

Figure 12B:
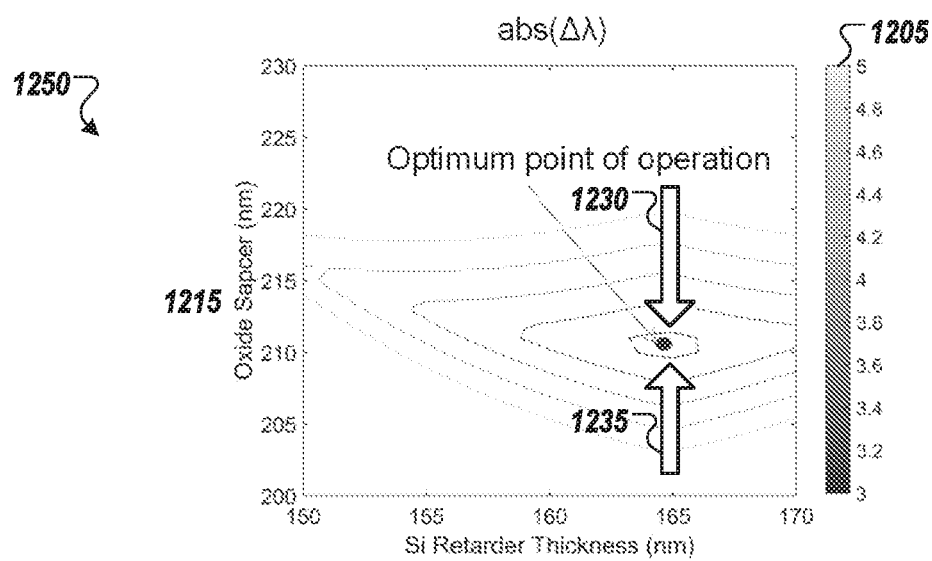
FIG. 12B is a graphical representation of an absolute value of a difference in TE and TM wavelengths.

FIG. 12B is a graphical representation 1250 of an absolute value of a difference in TE and TM wavelengths (i.e., wavelength shift $\Delta\lambda$), in accordance with at least one embodiment described herein. Potential geometry for the retarder 1210 and spacer 1215 may be better where the absolute value of $\Delta\lambda$, is minimized. As illustrated, the arrows indicate a direction of decreasing birefringence. It can be seen that a boundary between the curves 1230 and 1235 represents a low (e.g., below 3.3) absolute value of $\Delta\lambda$. As illustrated, the potential geometry may use any spacer thickness and retarder thickness defined by the dark blue "diamond" shape that is bounded between approximately 209-212 nm spacer thickness and 163-166 nm retarder thickness.

Figure 13A:
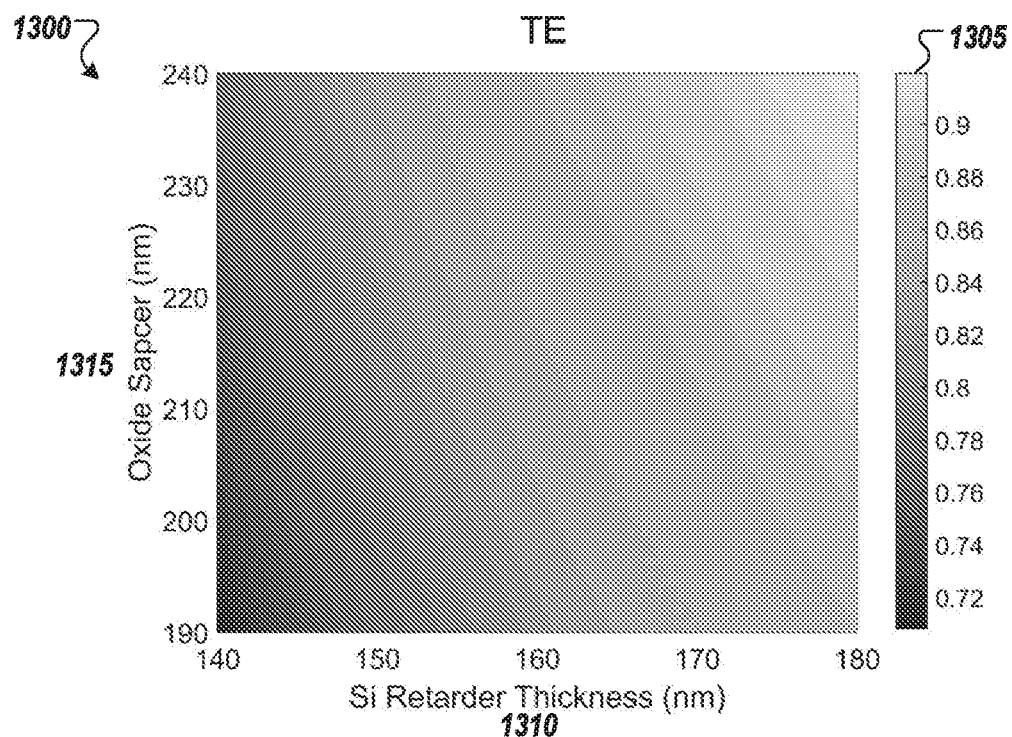
FIG. 13A is a graphical representation of an overlap loss of TE mode for a sub-wavelength grating structure.

FIG. 13A is a graphical representation 1300 of an overlap loss of TE mode 1305 for a sub-wavelength grating structure, in accordance with at least one embodiment described herein. It can be seen that an overlap loss of the TE mode 1305 may be approximately 1 dB for the sub-wavelength grating structure. In at least one embodiment, the overlap loss may be reduced with a transition structure such as a tapered waveguide with SWG structures. As illustrated, the overlap loss of the TE 1305 mode is the smallest at a 140 nm thick retarder 1310 and a 190 nm thick spacer 1315. The overlap loss of TE mode may increase as retarder thickness increases. The overlap loss of TE mode may increase as both retarder thickness 1310 and spacer thickness 1315 increase.

Figure 13B:
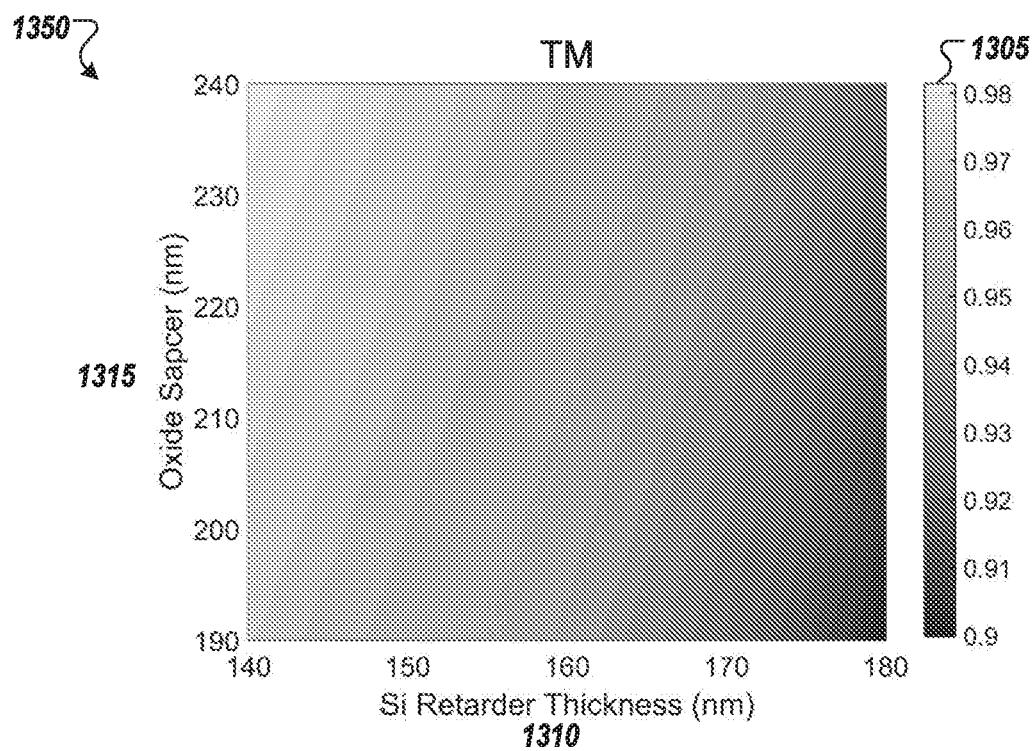
FIG. 13B is a graphical representation of an overlap loss of TE mode for a sub-wavelength grating structure, all arranged in accordance with at least one embodiment described herein.

FIG. 13B is a graphical representation 1300 of an overlap loss of TE mode for a sub-wavelength grating structure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. An integrated optical component comprising:
   at least one input waveguide;
   at least one output waveguide;
   a first slab waveguide disposed between the at least one input waveguide and the at least one output waveguide, wherein the first slab waveguide includes SiN;
   a second slab waveguide comprising a sub-wavelength grating structure; and
   a third cladding slab disposed between the first slab and the second slab, wherein a thickness of the second slab waveguide and the thickness of the third cladding slab reduce a birefringence of the integrated optical component.

2. A waveguide-based optical device, comprising:
an input waveguide configured to receive an input signal;
a signal splitter configured to divide the input signal into a plurality of beams;
a set of output waveguides configured to receive the plurality of beams from the signal splitter; and
a free-space slab propagation region disposed between a signal splitter and a plurality of output waveguides, wherein the free-space slab propagation region includes:
a silicon nitride (SiN) layer; and
a retarder layer disposed apart from the SiN layer, the retarder layer having an effective refractive index based on at least a first refractive index and a second refractive index provided by layers formed in the retarder layer.

3. The waveguide-based optical device of claim 2, wherein the free-space slab propagation region comprises a birefringence below a threshold birefringence value, wherein the birefringence is a difference between a transverse electric (TE) effective refractive index and a transverse magnetic (TM) effective refractive index.

4. The integrated optical component of claim 1, wherein the sub-wavelength grating structure comprises alternating layers of a first layer and a second layer.

5. The integrated optical component of claim 4, the first layer having a first refractive index and the second layer having a second refractive index.

6. The integrated optical component of claim 5, the second slab waveguide having a third refractive index, wherein the third refractive index is an effective refractive index based on the first refractive index and the second refractive index.

7. The integrated optical component of claim 1, wherein the second slab waveguide includes Si and the third cladding slab includes $SiO_2$.

8. The integrated optical component of claim 1 further comprising a free-space slab propagation region that includes the first slab waveguide, the second slab waveguide and the third cladding slab.

9. The integrated optical component of claim 8, wherein the free-space slab propagation region comprises a birefringence below a threshold birefringence value, wherein the birefringence includes a difference between a transverse electric (TE) effective refractive index and a transverse magnetic (TM) effective refractive index.

10. The integrated optical component of claim 9, wherein the threshold birefringence value approximately 1.

11. The integrated optical component of claim 1 further comprising a free-space slab propagation region that includes a silicon nitride (SiN) layer and a retarder layer disposed a particular distance from the SiN layer.

12. The integrated optical component of claim 11, wherein the retarder layer comprises a sub-wavelength structure that comprises a first layer with a first refractive index and a second layer with a second refractive index.

13. The integrated optical component of claim 12 further comprising a spacer layer disposed between the SiN layer and the retarder layer.

14. The integrated optical component of claim 13, wherein the spacer layer includes silicon dioxide ($SiO_2$).

15. The integrated optical component of claim 1, wherein the integrated optical component is one of: a delay line interferometer based de-multiplexer, an optical differential phase-shift keying demodulator, or an arrayed waveguide grating de-multiplexer.

16. The integrated optical component of claim 1, the at least one input waveguide being configured to receive an input signal, the integrated optical component further comprising:
a signal splitter configured to divide the input signal into a plurality of beams; and
a set of output waveguides configured to receive the plurality of beams from the signal splitter.

17. The waveguide-based optical device of claim 2, wherein the first refractive index is provided by a first layer formed in the retarder layer, and wherein the second refractive index provided by a second layer formed in the retarder layer.

18. The waveguide-based optical device of claim 17, wherein the retarder layer comprises a sub-wavelength structure.

19. The waveguide-based optical device of claim 18, wherein the sub-wavelength structure comprises alternating layers of the first layer and the second layer.

20. The waveguide-based optical device of claim 2 further comprising a spacer layer disposed between the SiN layer and the retarder layer.

* * * * *